H. HOWE.
Wheel Cultivator.
No. 109,129. Fig. 1. Patented Nov. 8, 1870.
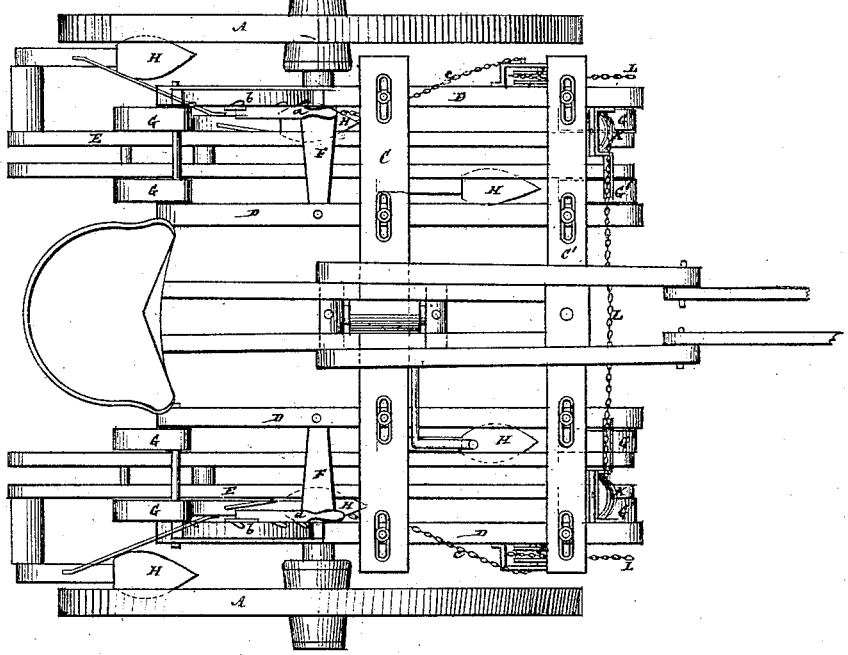
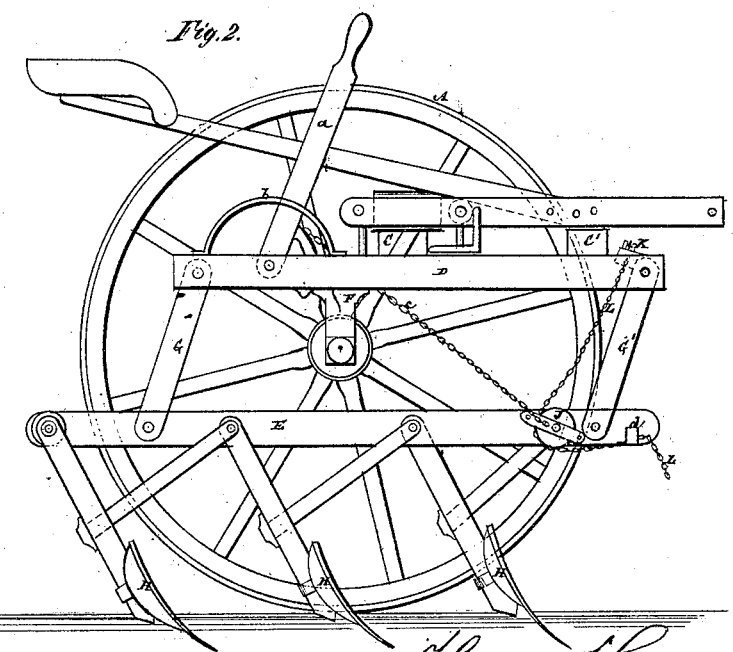
Fig. 2.
Witnesses.

UNITED STATES PATENT OFFICE.

HENRY HOWE, OF ONEONTA, NEW YORK.

IMPROVEMENT IN CULTIVATORS.

Specification forming part of Letters Patent No. 109,129, dated November 8, 1870; antedated October 29, 1870.

*To all whom it may concern:*

Be it known that I, HENRY HOWE, of Oneonta, in the county of Otsego and State of New York, have invented a new and useful Improvement in Cultivators, of which the following is a full, clear, and exact description, reference being had to the accompanying drawings, forming part of this specification, and in which—

Figure 1 represents a plan of a cultivator constructed in accordance with my improvement, and Fig. 2 a side view of the same with one of the running-wheels removed.

Similar letters of reference indicate corresponding parts in both of the figures.

My invention consists in a novel manner of hanging the plow-beams to the main frame of the cultivator by means of duplicate pendants to each beam, so arranged as that a parallel and uniform motion is secured to the beam, and its plows or shovels, in or during the rising or falling of the same, are entered into or withdrawn from the earth in direction of their length.

The cultivator represented in the accompanying drawings has many parts or features in common with that shown and described in Letters Patent of the United States No. 63,050, issued to me, conjointly with E. R. Ford, on the 19th day of March, 1867, so that it will only be necessary here to refer at large to the features or parts which go to make up the present improvement; but in this machine I prefer to so construct the cultivator as that larger outside running-wheels, A A, may be used without interference from the cross-bar C of the main frame, and so that each plow-beam E may, if desired, carry three or more shovels, H H H.

The main frame of the machine may be said to consist of two horizontal side frames, D D, each carrying a lower bracket, F, for support of the running-wheels, and connected by the cross-bars C C' in a laterally-adjustable manner, to adapt the machine to different widths of rows or furrows. Each plow-beam E is connected to opposite ends of the side frame, D, under which it is arranged by double pendants G G', so that in the swinging or rising and lowering of the plow-beams and their shovels H H H, whether as effected by the run of the machine over the ground or as adjusted by the driver, a parallel and uniform motion is secured to the same, the rear shovel or shovels, in lifting the plow-beams, moving no faster or more than the forward shovel, and a moderate lifting action to each plow-beam securing an all-sufficient lift to the forward plow or shovel to clear any obstacle. The standards of the shovels should of course be so pivoted and braced as to allow of the shovels being set at any required angle, and the plow-beams may be raised or lowered and adjusted by hand when required to clear the shovels from the ground or give them varied depths of entry therein by or through levers $a$ $a$, notched stops or guards $b$ $b$, and chains $c$ $c$. The means by which I secure a parallel and uniform motion for each plow-beam and its several shovels, as hereinbefore described, is at once simple, effective, and durable. The draft is taken from the forward ends or portions of the plow-beams in a novel manner. Thus each plow-beam E carries a sheave or pulley, J, and each forward pendant, G', at or near its upper end, a sheave or pulley, K. A chain, L, is made to extend across the machine over the pulleys K and down to and round the pulleys J, from whence the ends of said chains may pass through suitable guides, $d$, and be provided with proper attachments for hitching the horses to them to establish the draft. In this way I not only secure an easy equalizing action for the draft as regards the pull of the horses without tendency to lateral strain, the chain L freely running over the sheaves and accommodating itself, but secure a low line of draft or point of draft attachment, which prevents bearing down of the pole on the horses' necks, and establish a raised run for the chain across the machine to clear standing or growing crops.

It is preferred to have the upper sheaves, K, carried by the pendants G', so that they will work with the latter in concert with the beams E and the lower sheaves, J, for the purpose of keeping the chain L from slipping off the upper sheaves and at its proper stretch in or during the rising and lowering of the beams.

What is here claimed, and desired to be secured by Letters Patent, is—

The plow-beams E, hung to the main frame of the machine by rearwardly-swinging pendants G G', in combination with the lever $a$ and chains $c$, so arranged and operating as to cause the plows to rise from the earth on coming in contact with an obstacle, substantially as shown and described.

HENRY HOWE.

Witnesses:
 FRED. HAYNES,
 HENRY PALMER.